May 19, 1936.　　　O. B. CARSON　　　2,041,283
SPECTACLE
Filed April 20, 1935
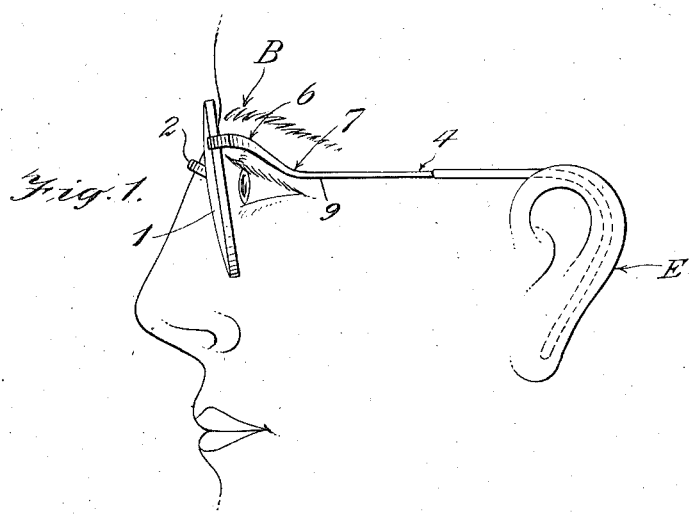
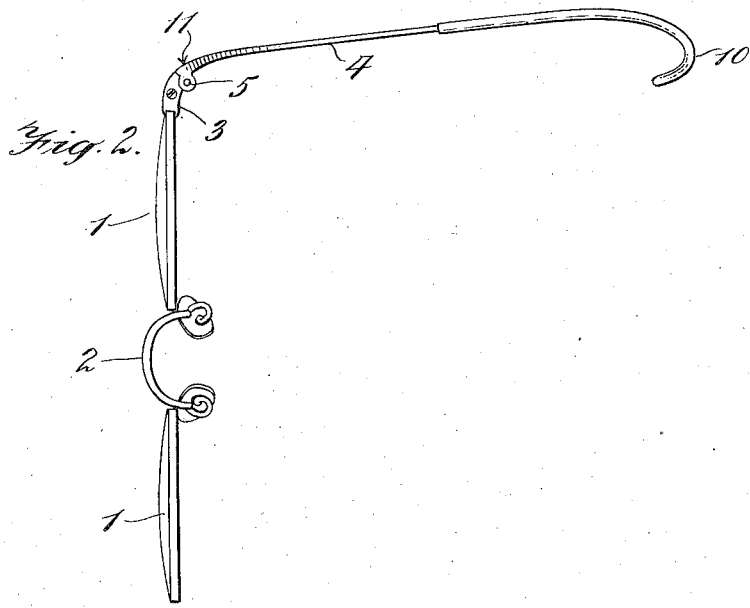
INVENTOR.
Oswald B. Carson
BY Waldo M. Chapin
ATTORNEY.

Patented May 19, 1936

2,041,283

UNITED STATES PATENT OFFICE 2,041,283

SPECTACLE

Oswald B. Carson, Scarsdale, N. Y.

Application April 20, 1935, Serial No. 17,430

1 Claim. (Cl. 88—52)

This invention relates to lens holding means or mountings for spectacles, including conventional spectacles, so-called rimless spectacles, and goggles, and the like used for ophthalmic purposes, and more particularly to the temples or side members used to retain said frames, mountings, goggles, and the like in proper position before the eyes of the wearer.

The principal object of my invention is to provide spectacle frames, spectacle mountings, goggles and the like, whose sides, or temples, as they are commonly termed, are so formed as to provide the wearer with unobstructed side vision, yet have the central or shank portion of said temples in a plane substantially lower than that of the point of their attachment to the end pieces of the lenses.

A further object of my invention is to provide such a construction which will permit the temples to fold down relatively close to the rear surfaces of the lenses, and when so folded the spectacles may be contained in the usual shallow spectacle case.

Another object of my invention is to combine the objects above set forth with a temple conformation which avoids the usual right angular relation between the butt of the temple and the vertical plane of the lens immediately back of its point of hinged attachment, and instead conforms in a graceful curve to the natural curvature of that portion of the wearer's orbit which extends downwardly and rearwardly at each side of the face.

Still another object of my invention is to combine the foregoing objects in a construction which is simple and economical to manufacture.

The objects set forth above have been only partially achieved in the known prior art. In previous constructions, for example, temples have been hinged to the end pieces of the frame or mounting above the geometrical center of the lenses, having a downwardly inclined shank passing back at an angle to the rear plane of the lenses in the direction of the top of the wearer's ears.

In other instances, elongated end pieces or links have been attached to the upper peripheral portion of the lenses or lens holding rims or straps and these end pieces or links have been curved downwardly and rearwardly to provide a more aesthetic appearance and avoid the right angular attachment. However, in these latter constructions, the elongated, downwardly and rearwardly curving end pieces, to gain the necessary aesthetic effect, must usually be carried so far to the rear and/or to the side of the lenses as to require a deeper and/or longer case to contain the frame when not in use, which type of case is most inconvenient for one to carry in the pocket or hand bag. If these end pieces are made short enough to fit into the more convenient, shallow case, the desirable appearance resulting from a downward and rearwardly sweeping curve must necessarily be almost entirely sacrificed. Furthermore, in such constructions, there is the added disadvantage that the extended end pieces may offer a dangerous leverage which would cause them to be readily bent out of alignment. And in the case of rimless spectacles there is danger of breaking the lenses because of this leverage if subjected to accidental pressure against the end pieces.

In my improved construction I overcome all of these disadvantages by forming the butt ends of the temples in a downwardly and rearwardly extending curve, which curve begins immediately back of the points of hinged attachment of the temples to the end pieces, and substantially conforms to the curvature of the downwardly and rearwardly extending portion of the wearer's orbit. This enables the manufacturer to employ the usual types of short end pieces thereby producing an economical, practical and good-looking construction.

My invention is described in detail below, reference being made to the accompanying drawing, in which:

Fig. 1 is a side view of spectacles in the construction of which the present invention has been embodied.

Fig. 2 is a fragmentary, detail view thereof in plan, one temple being omitted.

In the now-preferred embodiment of the invention selected for illustration, the parts designated by the reference characters 1 are respectively the lenses of a pair of spectacles, and these with the bridge 2 and end-piece 3 may be of any suitable structure and are shown as of usual form. At 4 I have shown a temple connected to the end-piece 3 by a conventional hinge 5. The right-hand temple is shown in plan in Fig. 2, and the left-hand temple is shown in Fig. 1. They are, of course, symmetrical in construction, and the description of one applies to both, so the same reference characters are used to designate like parts in each.

In pursuance of the invention, instead of the temples 4 passing directly backward to the top of the wearer's ear E in a relatively straight line as is usual, and forming an approximate right angle with the rear plane of the lens 1, each temple curves gradually downward at 6 and rearward at 7 from the point of its hinged attachment 5 to the end piece 3. The pintle of the hinge 5 being at a point immediately behind the rear plane of the lens 1, and the end pieces 3 being attached to the upper peripheral portion of the lens rim, the curve follows a line conforming substantially to the curvature of the wearer's orbit and eyebrow B giving a completely unobstructed field of useful side vision in contrast to the usual angular connection. From a point in spaced relation to the rear plane of the lens, at 9, the temple then extends in a substantially horizontal line back to the top of the wearer's ear E, then downward, terminating in any of the conventional ear engaging devices such, for example as the bow 10.

The temples and other parts of the frame or rimless mounting may be made of round, half round or flattened metal, or of shell or imitation shell such as pyroxalin, or of combinations of such materials. While my drawing shows a somewhat common construction of flat-side, metal temples, hinged to the usual so-called "English" joint or end piece, I do not restrict myself to the employment of any one of these usual types of materials or styles of end pieces. Also my improved construction may be applied to the rimless type of spectacle mountings whereby the lenses are secured to the end pieces with metal straps, employing screws through the lenses or other suitable means of attaching the said parts together.

The top plan view, Fig. 2, shows how the butts of the temples may be slightly bowed as at 11 to form an unbroken curve with the outer edges of the end pieces and thereby produce a desirable stream-line effect and at the same time avoid pressure against the sides of the wearer's face.

It is evident that the invention which I have described is economical for the reason that it enables the manufacturer to employ the usual types of end pieces, my improvement being confined to a novel conformation of the temple butts, readily accomplished by simple forming operations when the temples are made. It is further obvious that the conformity of the temple butts to the orbital curve is such as to permit complete side vision free from any obstruction.

This construction permits the optician to make simple adjustments with pliers by bending the temples at the curved portions 6 and 7 of their butts to vary the vertical plane of the lenses with relation to the horizontal line of the wearer's vision, and to provide accurate and comfortable fitting. The metal or other material is preferably sufficiently ductile for this purpose, and at the same time sturdy enough to withstand the usual strains incidental to use and to maintain such adjustments.

It is further apparent that my improved construction enables the user to fold the temples down in a position in relatively close proximity to the rear plane of the lenses so that the spectacles may be contained in a relatively shallow case of the conventional type for convenience in carrying. When so placed in their case there is no danger of the cover of the case exerting pressure upon the end pieces which might bend the end pieces 3 out of alignment or accidentally break the lenses.

Having thus described my improvement, I claim:

A spectacle mounting comprising an end-piece and a temple connected together hingedly at the lens margin above the horizontal lens-centre line, said temple being formed with a curve extending gradually downwardly and rearwardly from the hinge in substantial conformity with the orbital curvature, whereby the field of useful side vision is unobstructed, then merging gradually into a straight shank portion extending in a horizontal line to the wearer's ear, and terminating in a retaining portion.

OSWALD B. CARSON.